United States Patent
Wetters et al.

(10) Patent No.: US 10,112,782 B2
(45) Date of Patent: Oct. 30, 2018

(54) MOTOR DRIVEN ROLLER SUPPORT

(71) Applicant: Dematic Corp., Grand Rapids, MI (US)

(72) Inventors: Paul L. Wetters, Rockford, MI (US);
Leo A. Battreall, Rockford, MI (US);
Joseph A. Fester, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 15/623,908

(22) Filed: Jun. 15, 2017

(65) Prior Publication Data
US 2017/0362040 A1 Dec. 21, 2017

Related U.S. Application Data

(60) Provisional application No. 62/351,478, filed on Jun. 17, 2016.

(51) Int. Cl.
| | |
|---|---|
| B65G 47/00 | (2006.01) |
| B65G 47/52 | (2006.01) |
| B65G 47/54 | (2006.01) |

(52) U.S. Cl.
CPC .................................. B65G 47/54 (2013.01)

(58) Field of Classification Search
None
See application file for complete search history.

(56) References Cited

U.S. PATENT DOCUMENTS

| | | | |
|---|---|---|---|
| 4,928,505 A | 5/1990 | Parks et al. | |
| 5,117,961 A * | 6/1992 | Nicholson | B65G 47/54 198/369.5 |
| 5,901,830 A | 5/1999 | Kalm et al. | |
| 5,918,728 A * | 7/1999 | Syverson | B65G 13/06 198/784 |
| 6,644,459 B2 * | 11/2003 | van Leeuwen | B65G 15/105 198/370.06 |
| 9,365,361 B1 | 6/2016 | Skarlupka | |
| 2002/0033320 A1 | 3/2002 | Matsuoka et al. | |

(Continued)

OTHER PUBLICATIONS

International Search Report and Written Opinion of the International Searching Authority from corresponding Patent Cooperation Treaty (PCT) Application No. PCT/IB2017/53573, indicated completed on Sep. 28, 2017.

*Primary Examiner* — Kavel Singh
(74) *Attorney, Agent, or Firm* — Gardner, Linn, Burkhart & Ondersma, LLP

(57) ABSTRACT

A motor driven roller support assembly includes a motorized roller having a cylindrical outer surface that is configured to rotate, a support frame within which the roller is mounted, and a roller support connected to the support frame and engaging the outer surface of the motorized roller. The roller support may include a pair of support wheels for contacting the outer surface of the motorized roller, and include a pivot whereby the roller support is moveable relative to the support frame. The assembly may be integrated with a transfer conveyor, such as a right angle transfer having transfer blades that include belts driven by the motorized roller. The roller support engages the motorized roller in a direction that is generally opposite from the direction in which the belts engage the motorized roller to thereby counteract forces imparted by the belts on the motorized roller.

21 Claims, 11 Drawing Sheets

(56) References Cited

U.S. PATENT DOCUMENTS

| | | |
|---|---|---|
| 2008/0073185 A1 | 3/2008 | Brayman et al. |
| 2010/0179686 A1 | 7/2010 | Carlson et al. |
| 2011/0073442 A1 | 3/2011 | Rau et al. |
| 2011/0114444 A1 | 5/2011 | Butler et al. |
| 2012/0125735 A1 | 5/2012 | Schuitema et al. |
| 2014/0014468 A1 | 1/2014 | Pilarz et al. |
| 2016/0046451 A1 | 2/2016 | German |

\* cited by examiner

MOTOR DRIVEN ROLLER SUPPORT

CROSS REFERENCE TO RELATED APPLICATION

The present application claims priority of U.S. provisional application Ser. No. 62/351,478 filed Jun. 17, 2016, which is hereby incorporated herein by reference in its entirety

BACKGROUND AND FIELD OF THE INVENTION

The present invention is directed to a motor driven roller support, and in particular to an assembly that may be used in a conveyor system.

Motorized rollers, or motor driven rollers, are known in the conveying field. Such rollers include internal motors for driving the rollers and are used in roller conveyors for transporting items. The motorized rollers conventionally span between side frames or rails of a conveyor, with the roller being rotationally driven to convey items along the conveyor. Also known in the conveying industry are right angle transfer devices that operate to alter the conveying direction of items by ninety degrees. Right angle transfer devices may be constructed with spaced apart rollers, where the rollers allow items to be transported along a conveyor assembly in one direction, where transfer blades may be selectively raised between the spaced apart rollers to alter the direction of conveyance of an item. For example, the transfer blades include driven belts that alter the direction an item is conveyed with respect to orientation of the spaced apart rollers.

SUMMARY OF THE INVENTION

The present invention provides a motor driven roller support assembly. According to an aspect of the present invention, a motor driven roller support assembly comprises a motorized roller having a cylindrical outer surface that is configured to rotate, a support frame within which the roller is mounted, and a roller support engaging the outer surface of the motorized roller.

In a particular embodiment the roller support is connected to the support frame and includes a pair of support wheels for contacting the outer surface of the motorized roller, and includes a pivot whereby the roller support is moveable relative to the support frame. The support wheels have axes of rotation that are substantially parallel with the axis of rotation of the motorized roller, with the axes of rotation of the support wheels not being collinear with respect to one another.

The support frame includes a cross member to which the roller support is mounted, where the cross member may extend generally longitudinally with the axial orientation of the motorized roller. The support frame may also include a pair of side frame members with the motorized roller being mounted to and between the side frame members. Roller shaft mounts may be used to connect respective ends of the motorized roller to the side frame members, where the motorized roller may include one or two internal motors within the cylindrical tube of the motorized roller.

The motor driven roller support assembly is configured for integration with a right angle transfer conveyor, with the transfer conveyor including a platform to which the motor driven roller support assembly is mounted, and transfer blades mounted to the platform, with the transfer blades including belts that engage the outer surface of the motorized roller whereby the roller imparts motion to the belts. The belts of the transfer blades engage the outer surface of the motorized roller in a generally diametrically opposite orientation relative to the engagement of the roller support with the motorized roller. The roller support thus inhibits deflection or bending of the motorized roller that may otherwise damage or impart wear to the motorized roller, and in particular to the internal motor construction of the motorized roller.

These and other objects, advantages, purposes and features of this invention will become apparent upon review of the following specification in conjunction with the drawings.

DESCRIPTION OF THE PREFERRED EMBODIMENTS

Figure 1:
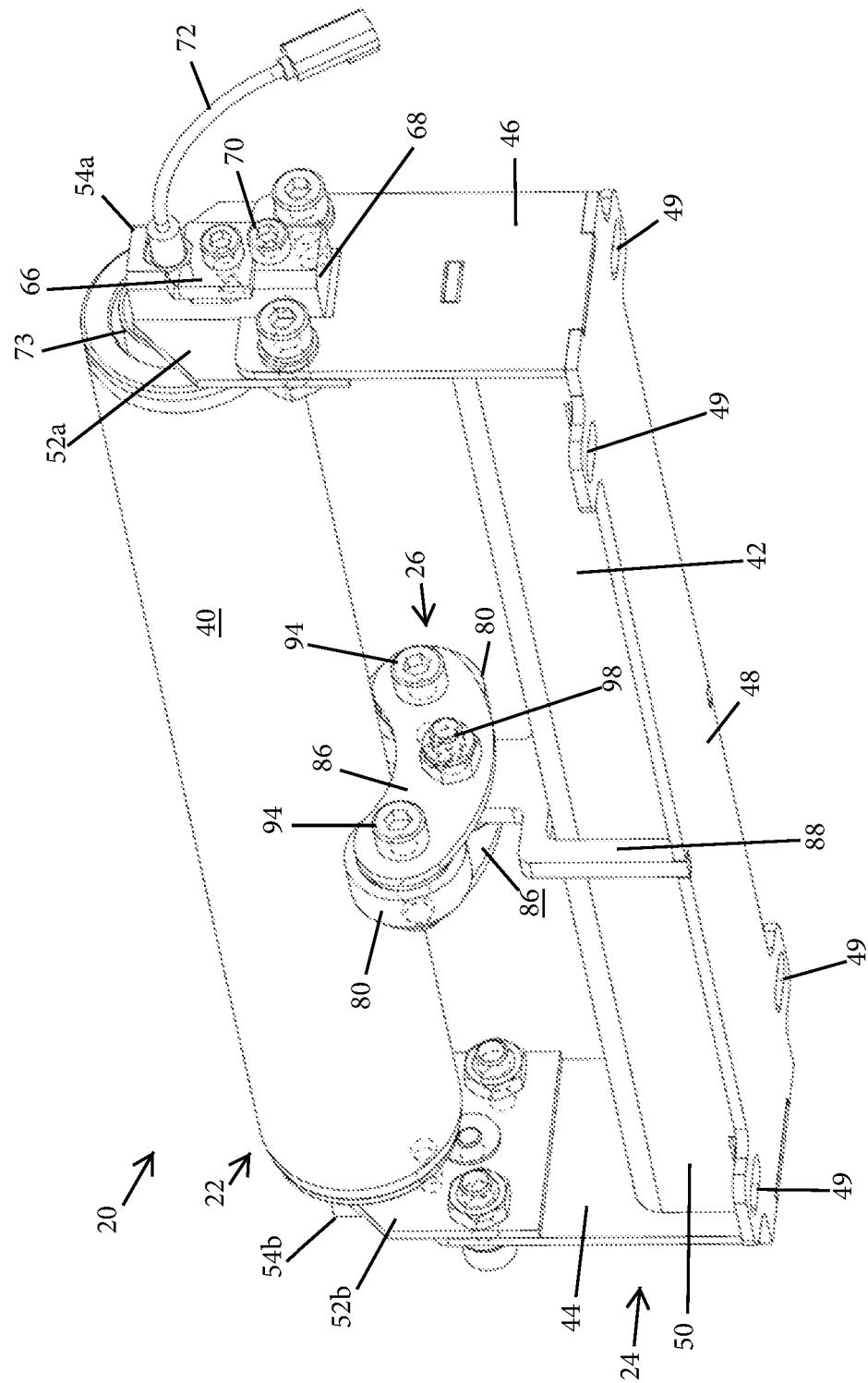
FIG. 1 is a perspective view of a motor driven roller and support assembly in accordance with an aspect of the present invention.

The present invention will now be described with reference to the accompanying figures, wherein the numbered elements in the following written description correspond to like-numbered elements in the figures. A motor driven roller support assembly 20 in accordance with aspects of the present invention is illustrated in FIG. 1. As there shown, assembly 20 includes a motorized drive roller 22 that includes an internal motor construction for imparting driving rotation to roller 22. Assembly 20 further includes a support frame 24 and a roller support 26 that is mounted to frame 24. The roller support 26 contacts roller 22 to counteract forces applied against roller 22 from directions that are generally diametrically opposite from the orientation of roller support 26 relative to roller 22. Roller support 26 thereby inhibits deflection or bending of roller 22 that may otherwise damage or impart wear to roller 22, including for example to the internal motor construction of roller 22.

Figure 2A:
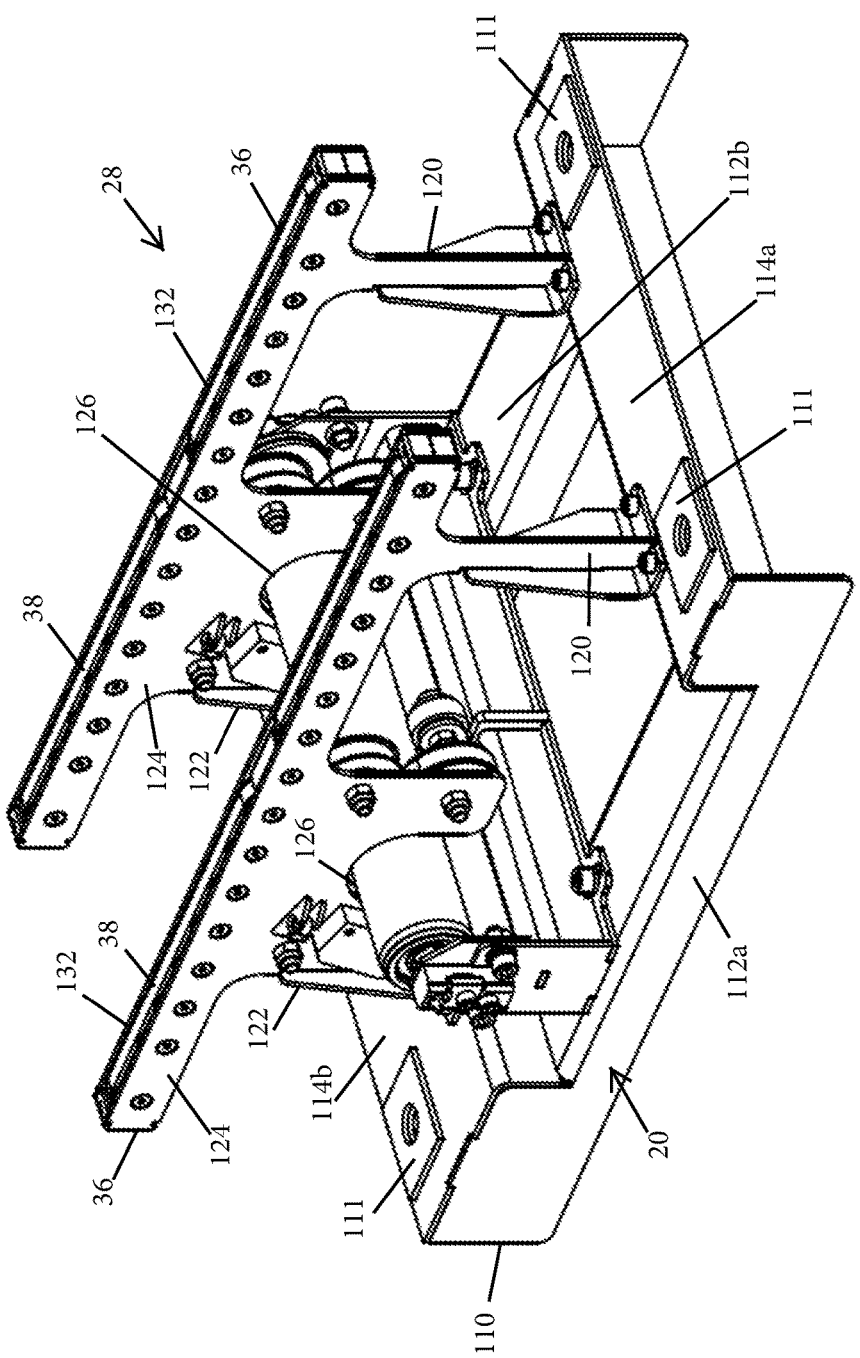
FIG. 2A is a partial perspective view of a right angle transfer conveyor incorporating the assembly of FIG. 1.
Figure 2B:
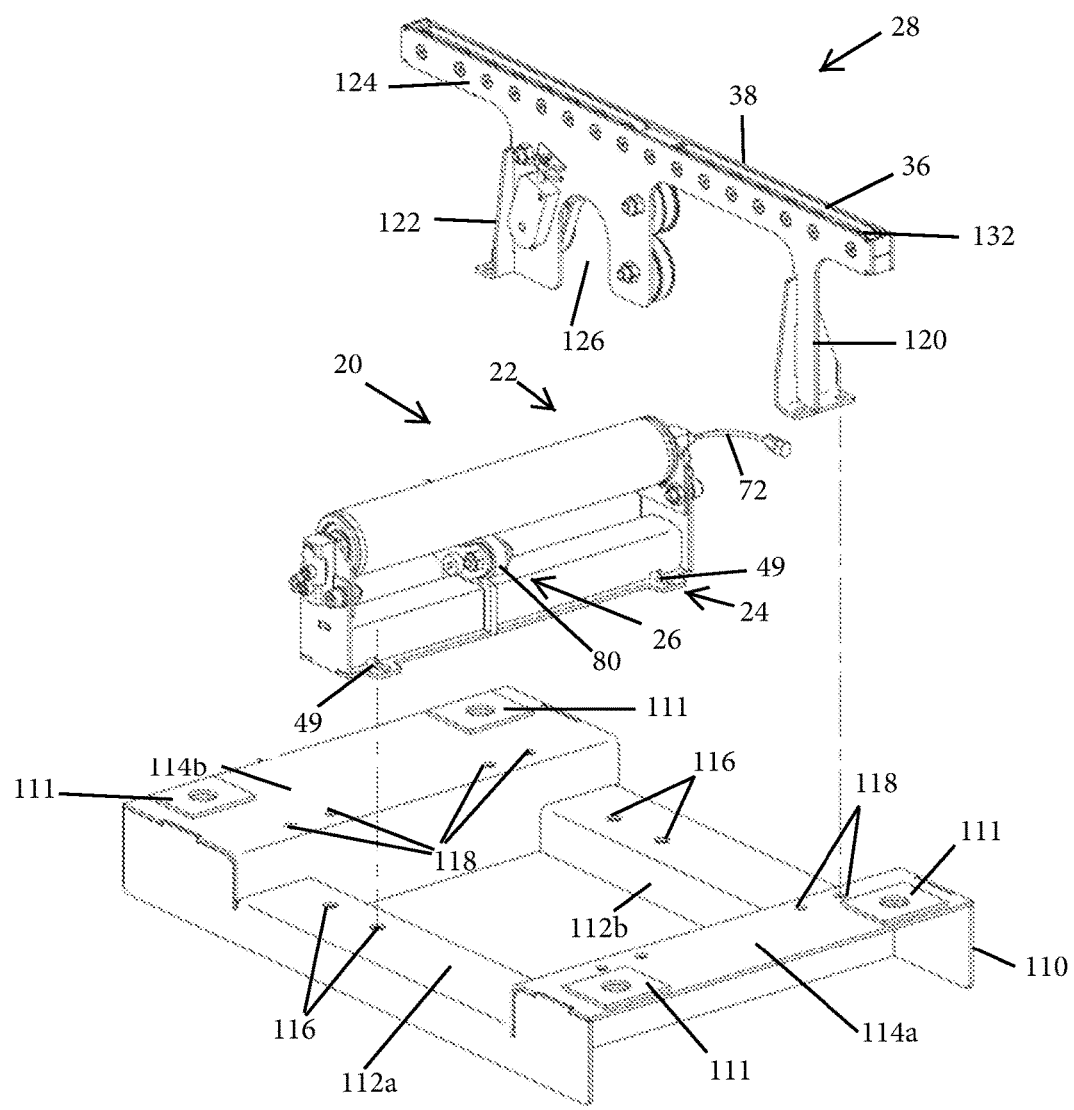
FIG. 2B is an exploded perspective view of the transfer conveyor of FIG. 2A with one transfer blade removed for purposes of illustration.
Figure 2C:
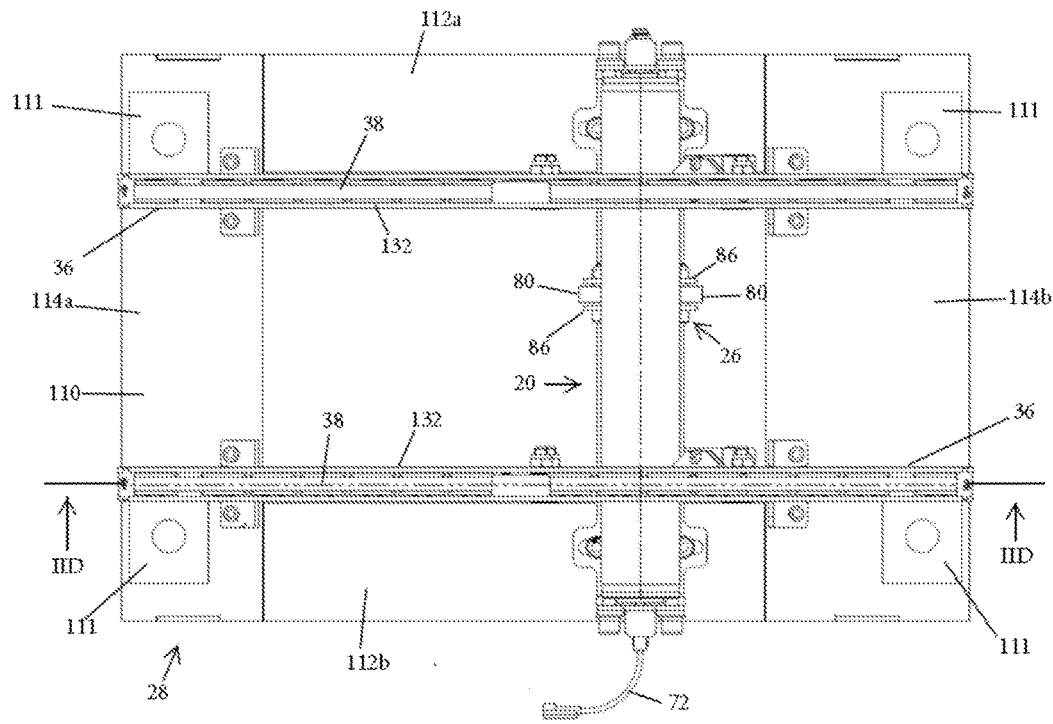
FIG. 2C is a top plan view of the transfer conveyor of FIG. 2A.
Figure 2D:
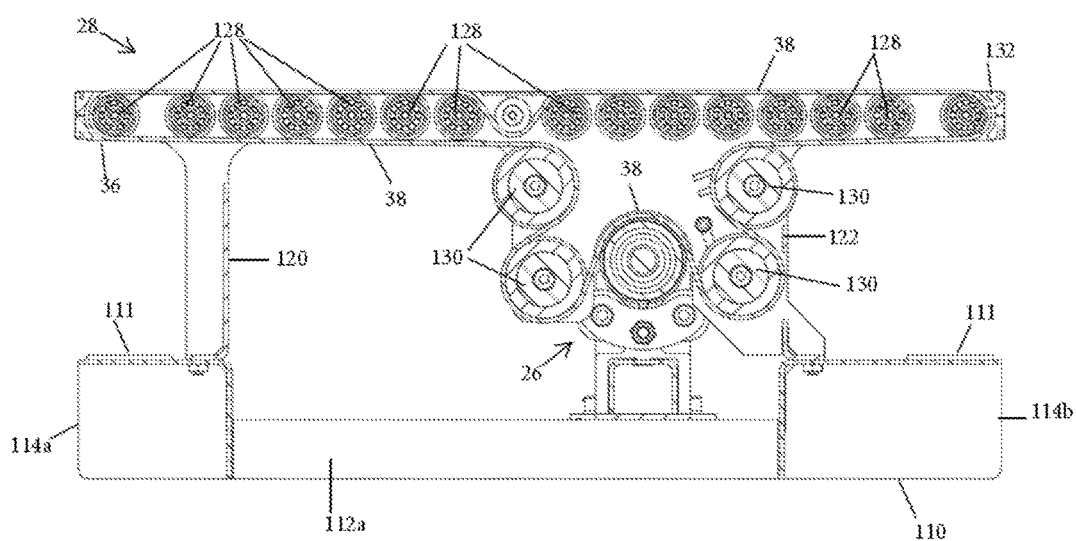
FIG. 2D is a side cross-sectional view of the transfer conveyor of FIG. 2A taken along the line IID-IID of FIG. 2C.
Figure 3:
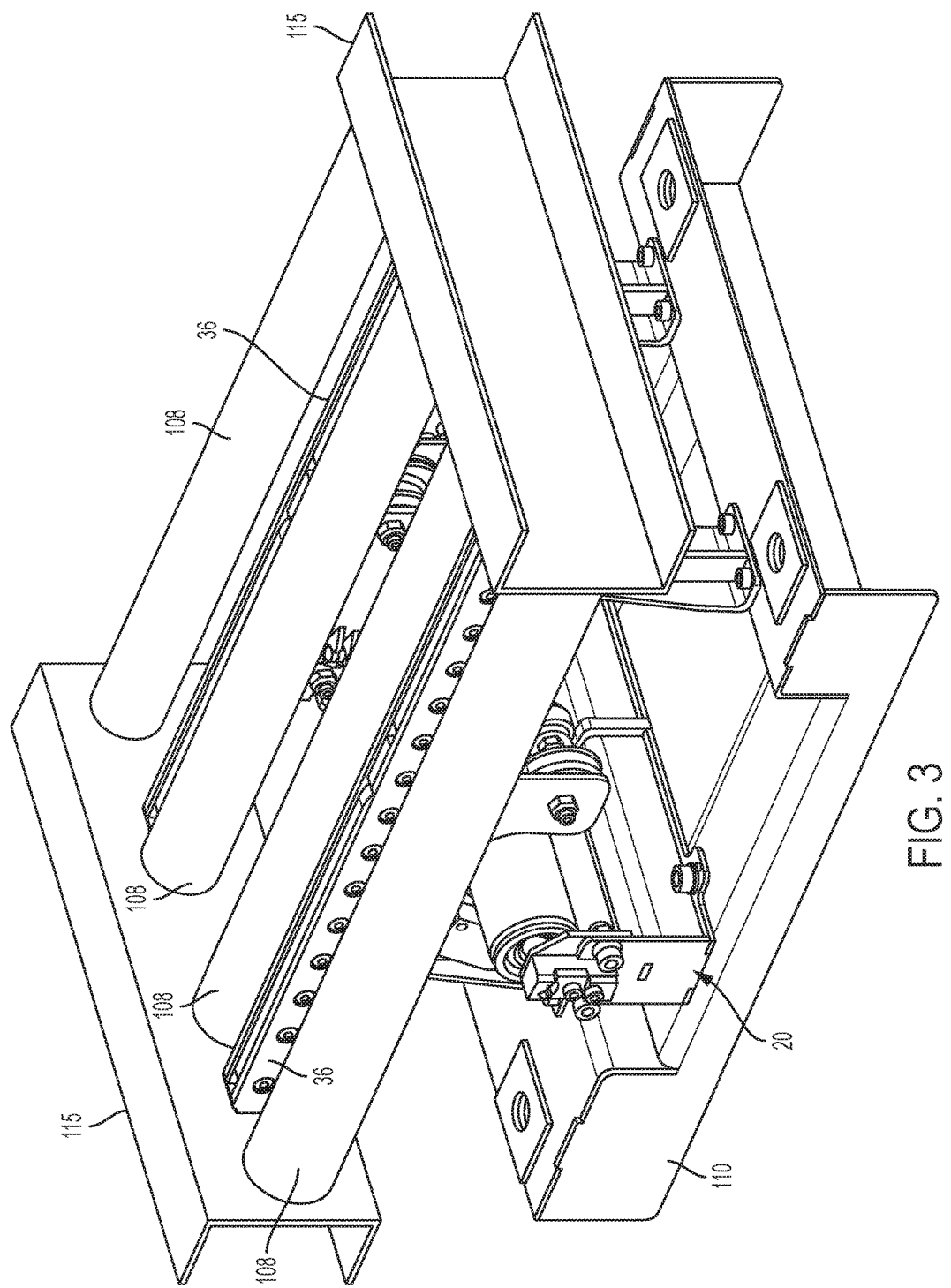
FIG. 3 is a perspective view of the right angle transfer conveyor of FIG. 2A shown with rollers in relation to the transfer blades.

In a particular embodiment, assembly 20 is integrated with a right angle transfer conveyor 28, such as shown in FIGS. 2A-3, where transfer conveyors 28 are used in conveyor systems to re-direct items that are being conveyed. For example, FIG. 3A discloses a conveyor system 30 that includes a main roller conveyor 32 and various input or output conveyors 34a, 34b, 34c and 34d with right angle transfer conveyors 28' located at the intersection of the main conveyor 32 and conveyors 34. Items being conveyed on main conveyor 32 may be re-directed to a selected conveyor 34 via one of the transfer conveyors 28', or alternatively, items conveyed on a conveyor 34 toward main conveyor 32 may be re-directed via one of the transfer conveyors 28', where transfer conveyors 28' may be constructed in the manner of transfer conveyor 28 of FIGS. 2A-3. As understood from FIGS. 2A and 2D, and discussed in more detail below, transfer conveyor 28 includes transfer blades 36 having belts 38, with belts 38 disposed or passing around the outer cylindrical surface 40 of roller 22, where surface 40 is formed by the tubular cylinder of roller 22 within which the internal motor construction is housed. Roller 22 is thus used to drive belts 38, with the belts 38 being pressed against surface 40 for sufficient engagement with the roller 22. Belts 38 only contact surface 40 over a limited arc of roller 22 at any given time such that belts apply a force against roller 22. That applied force from belts 38 is oriented in a direction that is generally opposed by roller support 26 to thereby inhibit deflection or bending of roller 22.

Assembly 20 is disclosed in further detail with reference to FIGS. 4-7. As there shown, support frame 24 includes a frame member 42 that comprises a cross member that, in the illustrated embodiment, extends generally longitudinally with roller 22. Support frame 24 further includes a pair of upright or side frame members 44, 46, with frame members 44, 46 being disposed on either end of frame member 42. Frame member 42 is further shown to include a lower plate 48 and an inverted C-shaped channel 50 affixed thereto, such as by welding, with the configuration thereby providing structural rigidity to frame member 42. A periphery of lower plate 48 extends beyond channel 50 and includes mounting holes 49 for securing assembly 20 to the transfer conveyor 28, as discussed below.

Figure 7:
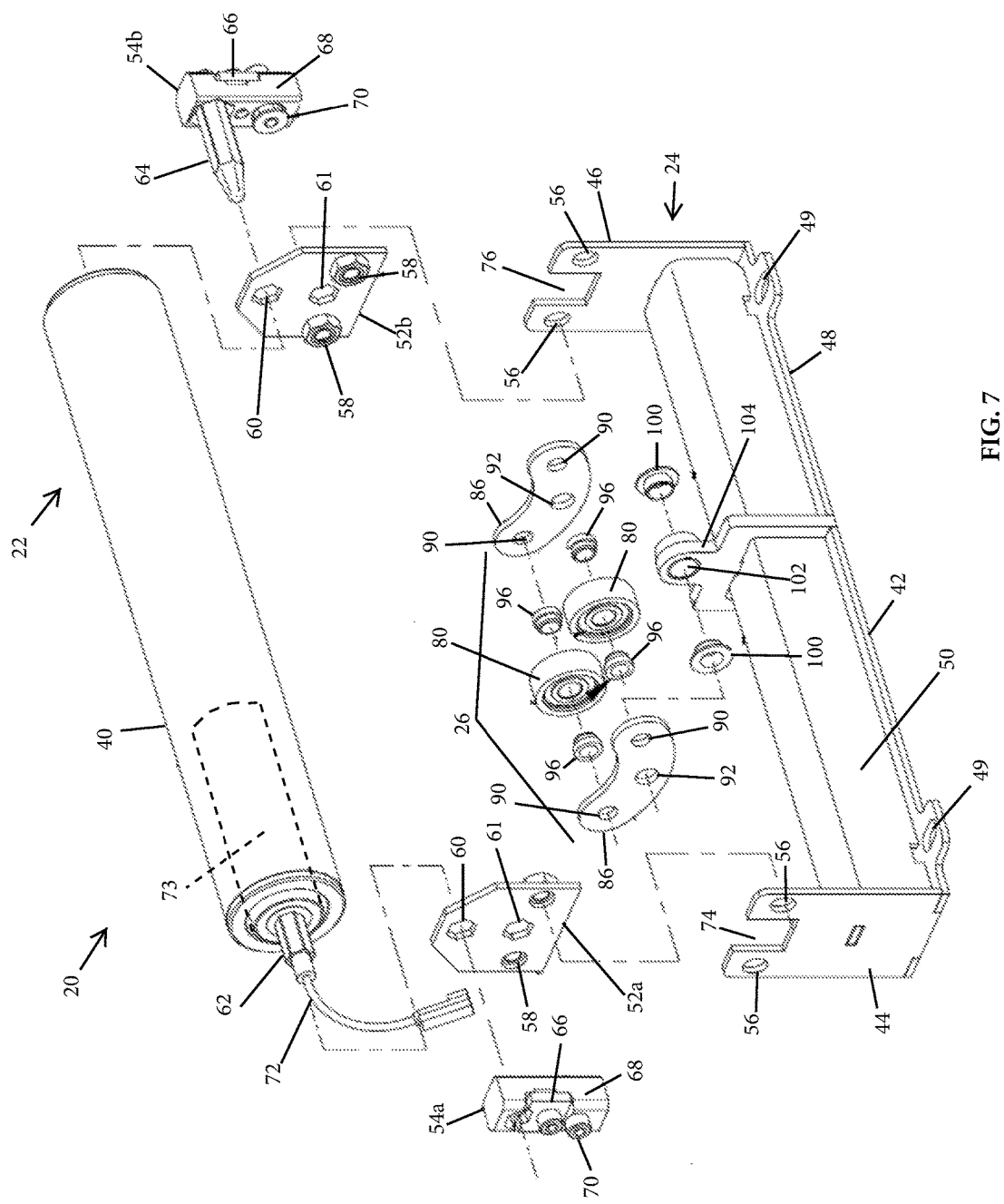
FIG. 7 is an exploded perspective view of the assembly of FIG. 1.

Roller 22 is mounted to support frame 24 at side frame members 44, 46, where in the illustrated embodiment a pair of mounting plates 52a, 52b and a pair of roller shaft mounts 54a, 54b are used in the mounting of roller 22 to side frame members 44, 46. Side frame members 44, 46 include apertures 56 that align with apertures 58 on mounting plates 52a, 52b for receiving fasteners to connect mounting plates 52a, 52b to respective side frame members 44, 46 (FIG. 7). Mounting plates 52a, 52b additionally include apertures 60 (FIG. 7) for receiving axles 62, 64 of roller 22, where axles 62, 64 define ends of roller 22. In the illustrated embodiment, apertures 60 have a hexagonal shape, with axles 62, 64 having a corresponding hexagonal shape for retaining axles 62, 64 against rotation.

Roller shaft mounts 54a, 54b in turn are used to mount roller 22 with side frame members 44, 46 by connection with mounting plates 52a, 52b. Roller shaft mounts 54a, 54b may comprise mounts as disclosed in U.S. Pat. No. 7,243,784, which is hereby incorporated herein by reference in its entirety. As understood from FIG. 7, axle 62 extends through aperture 60 of mounting plate 52a and is received within an upper or first aperture of shaft mount 54a. A clamp 66 holds axle 62 to body 68 of shaft mount 54a. A lower fastener 70 disposed through a lower or second aperture of shaft mount 54a to secure body 68 to mounting plate 52a at a lower hexagonal aperture 61 on plate 52a. In the illustrated embodiment, roller 22 includes a single electric motor with a power lead 72 for the electric motor construction 73 (FIG. 7) extending from axle 62 within the tubular cylinder of roller 22, whereby lead 72 extends out of shaft mount 54a. Conversely, axle 64 comprises a stub axle that is held in the upper or first aperture of shaft mount 54b, with clamp 66 used to secure axle 64 therein. Axle 64 is then passed through aperture 60 of mounting plate 52b and inserted into roller 22 for supporting roller 22 for rotation on axle 64. Shaft mount 54b likewise includes a lower or second aperture through which a lower fastener 70 is disposed to secure body 68 of shaft mount 54b to mounting plate 52b. Frame members 44, 46 each include a notched cutout or receptacle 74, 76, respectively, within which the elongate bodies 68 of shaft mounts 54a, 54b are received when roller 22 is secured to support frame 24.

Roller support 26 is mounted to frame member 42, where in the illustrated embodiment roller support 26 includes a pivot and a pair of support wheels 80 that engage the outer cylindrical surface 40 in a pivotal cradle engagement for supporting roller 22. Support wheels 80 comprise an external ring portion 82 (FIG. 6A) constructed of urethane for rolling engagement with cylindrical surface 40 of roller 22, with support wheels 80 additionally including internal bearings 84 (FIG. 6A) over which the ring portion 82 is mounted. Wheels 80 are supported between pivot plates 86, with pivot plates 86 in turn being pivotally attached to a yoke shaped mount 88 that is attached to frame member 42. As understood from FIG. 6, mount 88 may include a tab 89 for extending into an opening in channel 50.

Figure 6:
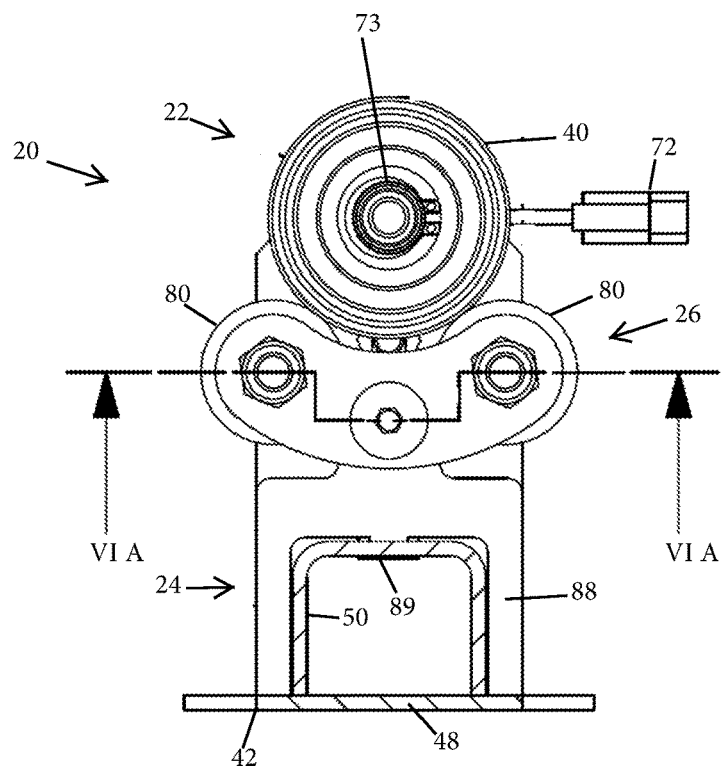
FIG. 6 is a cross-sectional view of the assembly of FIG. 1 taken along the line VI-VI of FIG. 5.
Figure 6A:
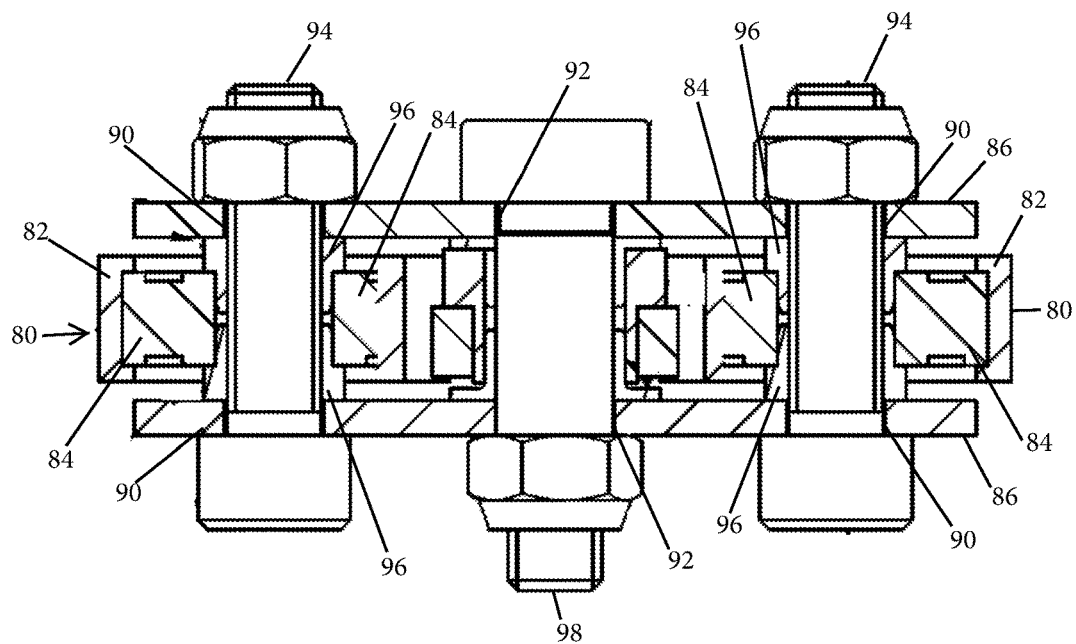
FIG. 6A is a cross-sectional view of a portion of the roller support taken along the line VIA-VIA of FIG. 6.

As best understood from FIGS. 6A and 7, pivot plates 86 each include a pair of wheel mounting apertures 90 and a pivot aperture 92. Wheel mount fasteners 94 are used to secure wheels 80 between pivot plates 86 via apertures 90, with spacers 96 being disposed on either side of wheels 80. The spacers 96 engage with and support the bearings 84 for rotation on or about fasteners 94. A pivot fastener 98 connects pivot plates 86 to mount 88 through apertures 92, with fastener 98 extending through a pair of pivot hubs 100 that engage with mount 88 on either side of a bore 102 disposed in an extension tab or flange 104 of mount 88. Pivot fastener 98 and the noted connection thus defines the pivot or a pivot axis or axle or spindle about which wheels 80 are able to pivot for conforming engagement with the outer cylindrical surface 40 of roller 22.

In the illustrated embodiment a single roller support 26 is shown that is disposed slightly off center relative to the midpoint of the length of roller 22. It should be appreciated that roller support 26 may be positioned at alternative locations along the length of roller 22, such as in locations adjacent or near where opposite forces may be applied. Still further, if desired, additional roller supports could be secured to support frame 24.

Referring again to FIGS. 2A-3 and 3A in which assembly 20 is integrated with transfer conveyor 28, and as also noted, transfer conveyors 28 may be integrated with conveyor system 30. In particular, transfer conveyors 28 are disposed to operate in connection with rollers 108 of the conveyor 28, where transfer blades 36 are selectively raised or lifted to extend between the rollers 108. Transfer blades 36 include belts 38 that move in a perpendicular orientation or direction relative to the conveyance direction of items on conveyor 32. As such, by raising or extending transfer blades 36 through the rollers 108, items being conveyed on main conveyor 32 can be re-directed to be conveyed down any of output conveyors 34.

Figure 3A:
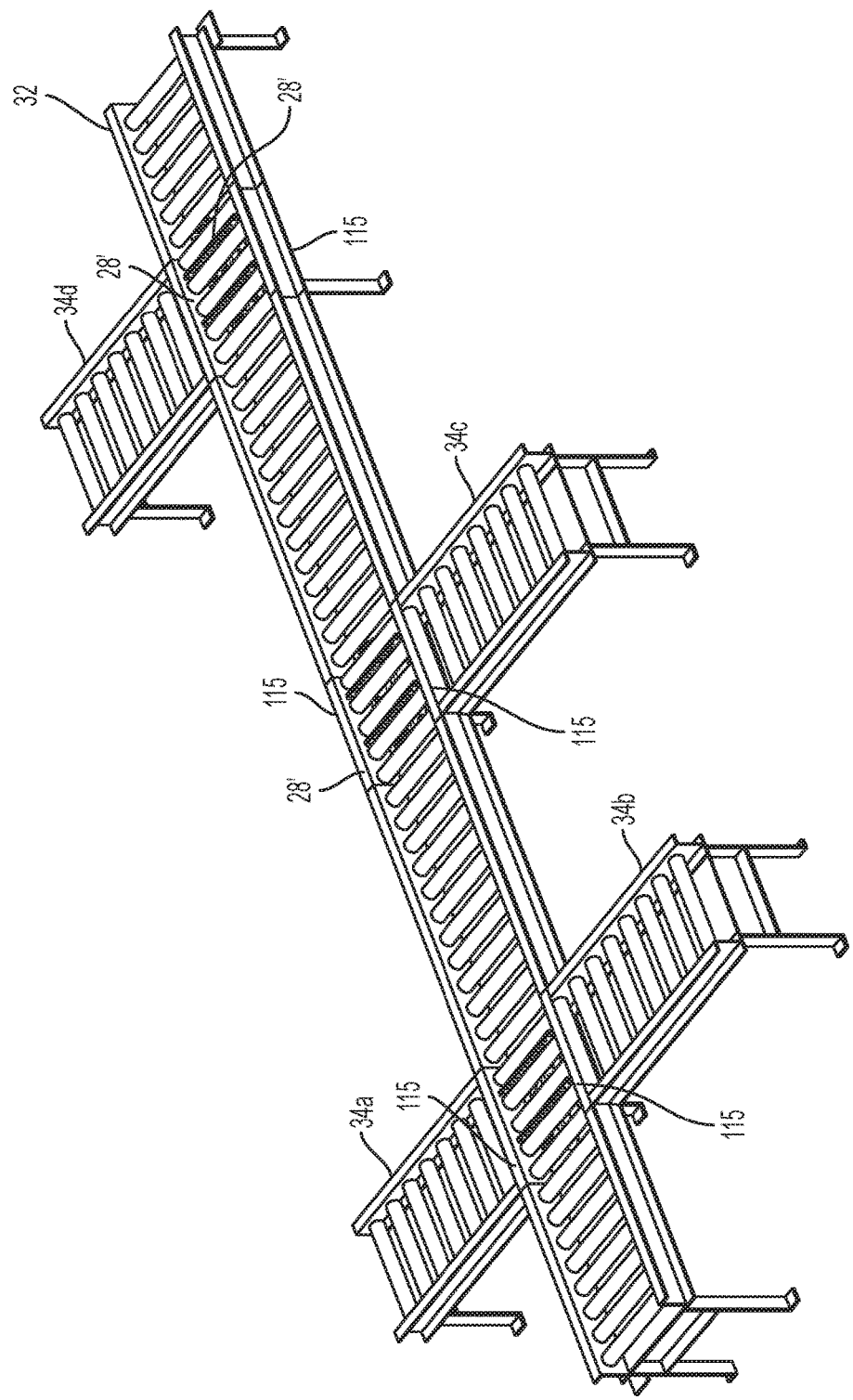
FIG. 3A is a perspective view of a conveyor system that may incorporate multiple right angle transfer conveyors of FIG. 3.
Figure 4:
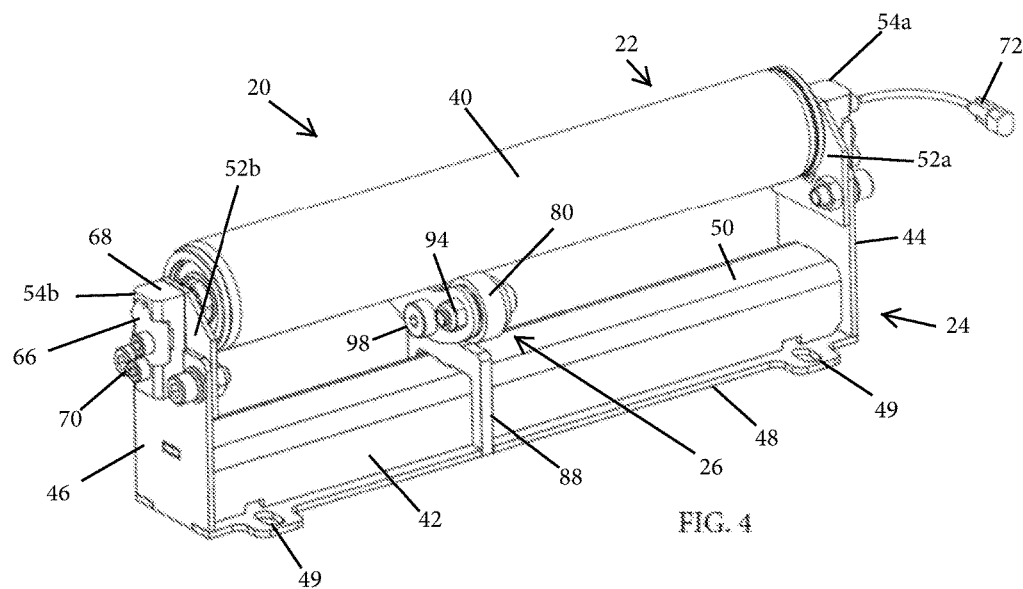
FIG. 4 is a perspective view of the motor driven roller and support assembly of FIG. 1 shown from an opposite side relative to the view of FIG. 1.
Figure 5:
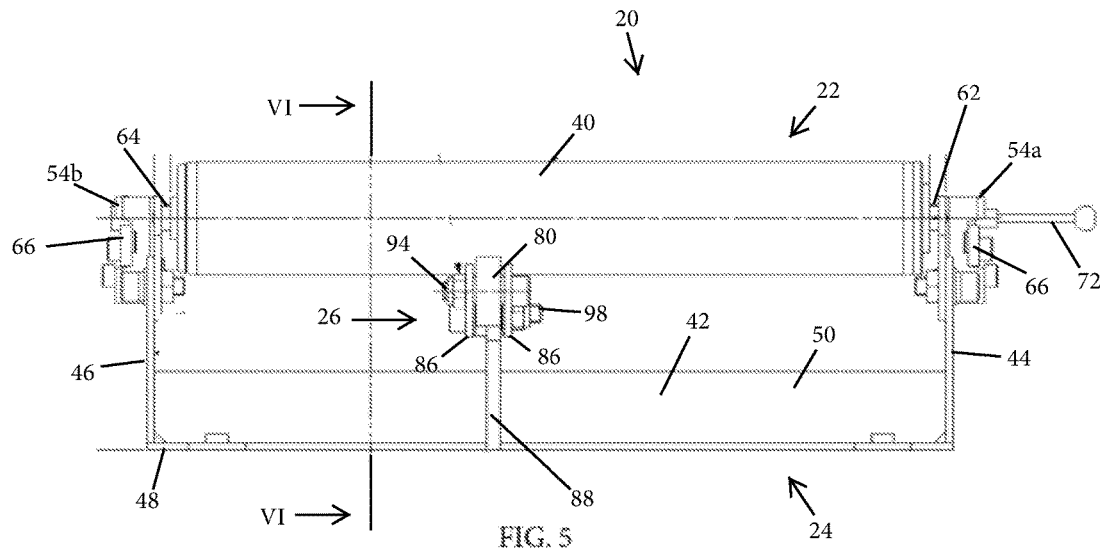
FIG. 5 is a side elevation view of the assembly of FIG. 1.

Transfer conveyor 28 includes a base or platform 110 comprising four perpendicularly oriented slats or members 112a, 112b, 114a, 114b. Actuators are used to raise or lift platform 110 with, for example, four such actuators being connectable to platform 110 at four connectors 111 located adjacent the corners of platform 110. The actuators may comprise pneumatic, hydraulic or electric actuators, with the connectors 111 including pads with mounting holes there through for receiving an end of the actuators. The actuators are thus able to raise the platform 110 to cause transfer blades 36 to extend between and through the rollers 108 of the conveyor 28. Transfer conveyor 28 itself may incorporate an upper frame 115 having rollers 108 mounted there between, such as shown in FIGS. 3 and 3A, with the upper frame 115 being of generally similar size to platform 110 and with platform 110 being connected for movement via actuators relative to the upper frame 115.

Assembly 20 is connected to platform 110, such as by way of fasteners, with platform 110 having corresponding opposed mounting holes 116 on members 112a, 112b for alignment with corresponding mounting holes 49 on lower plate 48 (FIG. 2B). Transfer blades 36 are likewise mounted to platform 110, such as via fasteners with platform 110 including opposed mounting holes 118 on members 114a, 114b for alignment with mounting holes on legs 120, 122 of transfer blades 36. As shown, assembly 20 is thus perpendicularly oriented relative to the orientation of transfer blades 36.

Transfer blades 36 include a frame or casing 124, such as may be formed by two separate stamped plates, with the casing 124 defining legs 120, 122. Casing 124 additionally includes or defines a receptacle 126 that is disposed over assembly 20 when assembled. Multiple conveyor wheels 128 and pulley wheels 130 (FIG. 2D) are disposed within casing 124, with the conveyor wheels 128 being contained within an upper elongate portion 132 that additionally defines a track within which belt 38 runs about conveying wheels 128. Pulley wheels 130 are positioned about or adjacent receptacle 126 to route belt 38 over roller 22. As best understood from FIG. 2D, a pair of lower most pulley wheels 130 are positioned when assembled to have a lower axis of rotation relative to the axis of rotation of roller 22, with belt 38 thereby being routed over the upper arc of the cylindrical surface 40 of roller 22. With belt 38 so disposed it will be appreciated that belt 38 imparts a generally downward force against roller 22, with roller support 26 being generally diametrically opposed to such forces to thereby inhibit the deflection or bending of roller 22. Moreover, as best understood with respect to FIG. 2C, the belts 38 of each of the two transfer blades 36 are disposed about roller 22, with roller support 26 being positioned between the two transfer blades 36.

Although the transfer conveyor 28 in FIGS. 2A-2D is shown to include two transfer blades 36, it should be appreciated that a transfer conveyor may be constructed with an alternative number of transfer blades 36 depending on the transfer requirements, such as the size and weight of items being conveyed. For example, such an alternative transfer conveyor may be provided with between three to eight such transfer blades 36, with the transfer blades 36 being spaced relative to each other on platform 110 to enable the transfer blades 36 to be extended between and through rollers of a roller conveyor. It should thus be appreciated that such an alternative transfer conveyor may have an alternate number of rollers relative to that shown in FIG. 3. Still further, an alternative transfer conveyor may include additional motor driven roller support assemblies, such as to engage with other transfer blades. For example, an additional motor driven roller support assembly 20 may be mounted to members 112A, 112B to be positioned parallel to the assembly 20 shown in FIGS. 2A-2D, with alternative transfer blades spanning members 114A, 114B to engage therewith.

Figure 8:
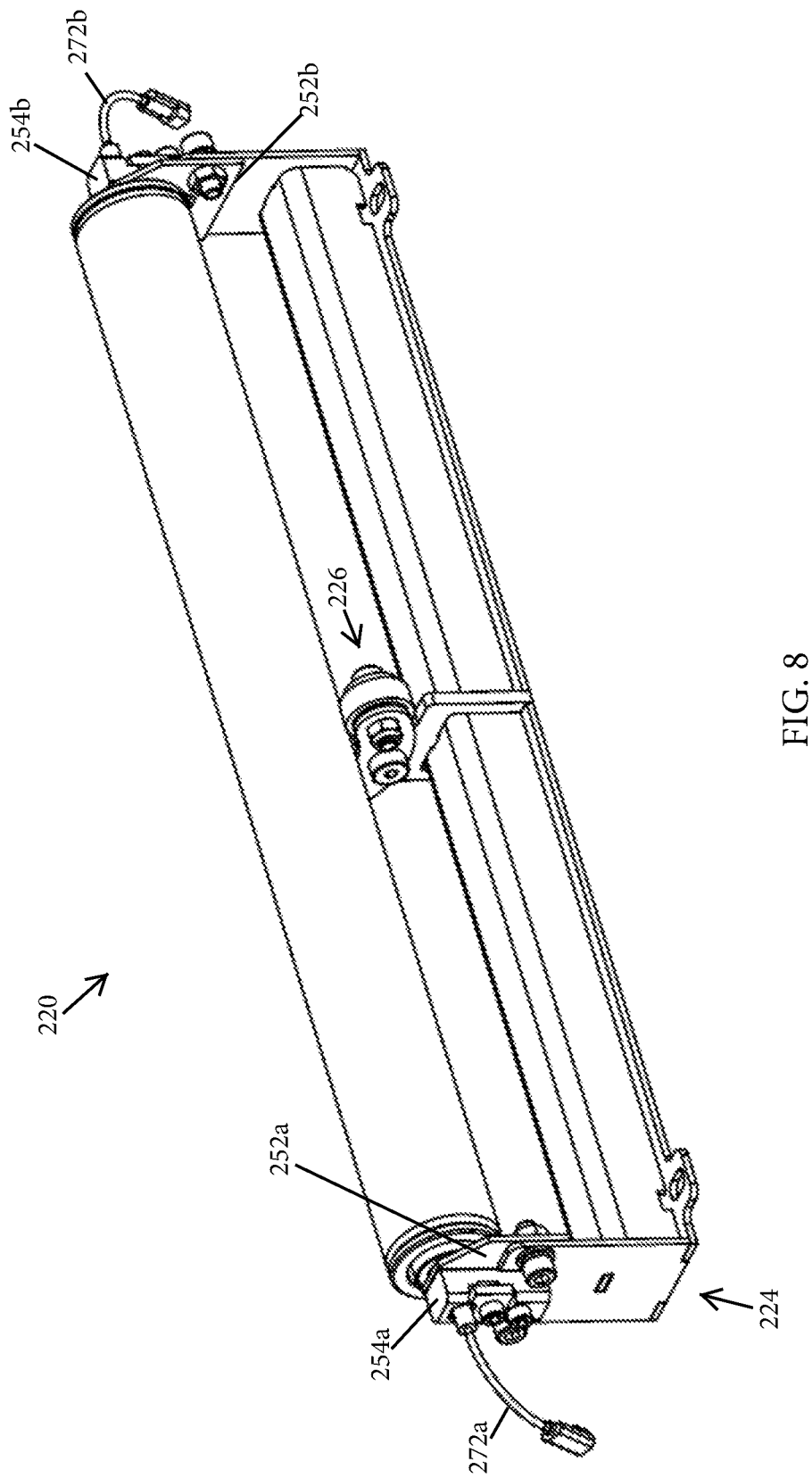
FIG. 8 is a perspective view of another motor driven roller and support assembly in accordance with an aspect of the present invention.
Figure 9:
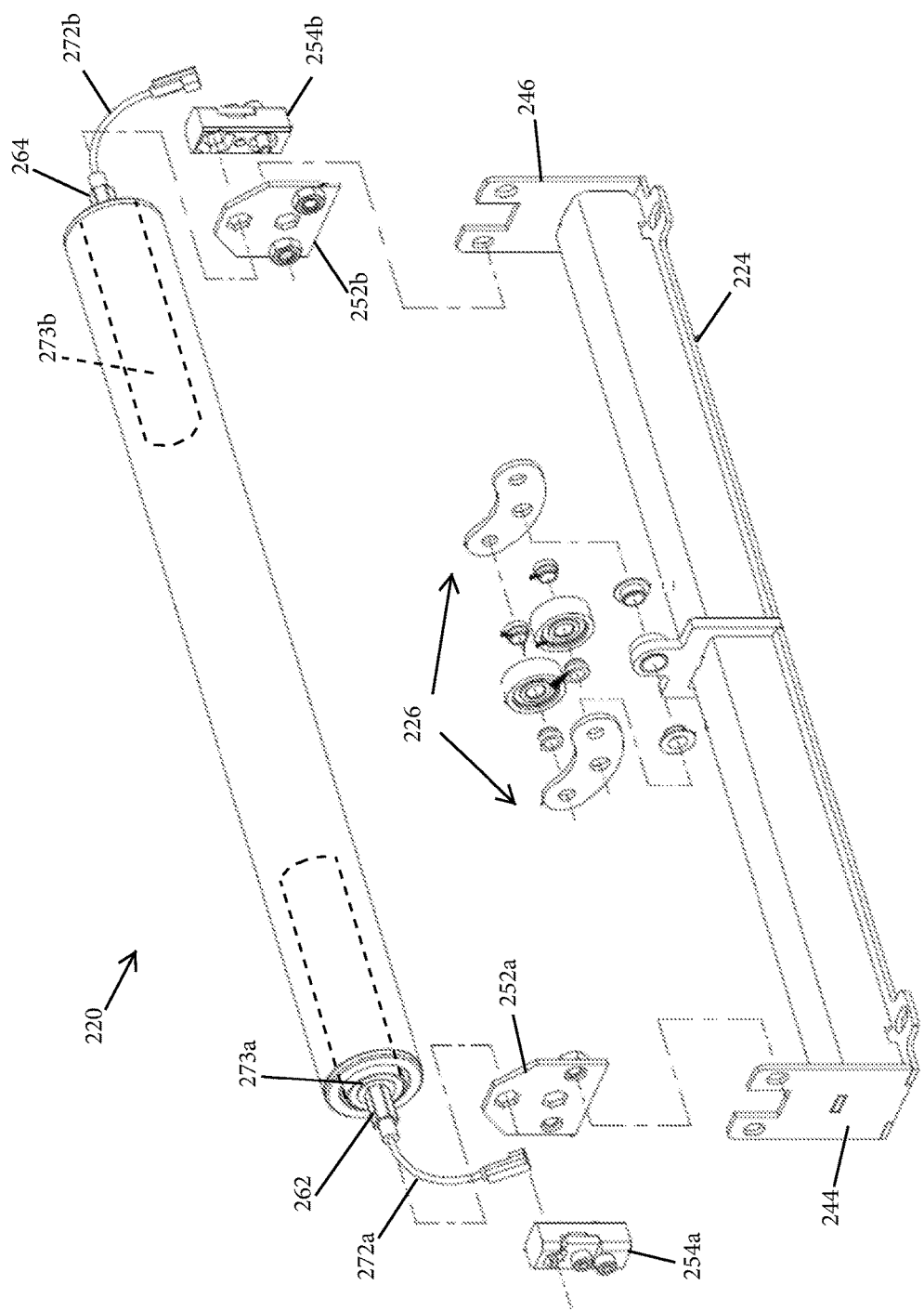
FIG. 9 is an exploded perspective view of the assembly of FIG. 8.

Referring now to FIGS. 8 and 9, another motor driven roller support assembly 220 is disclosed. Assembly 220 is of substantially similar construction to assembly 20 discussed above, with like components, constructions and features being identified with similar reference numerals but with "200" added to the reference numerals for assembly 220 relative to those of assembly 20. Due to the substantial similarity not all of the like features and components of assembly 220 are discussed herein.

Assembly 220 includes a motorized drive roller 222, a support frame 224 and a roller support 226. Motorized drive roller 222 includes an internal motor construction to thereby operate as a motor driven roller in similar manner to roller 22 discussed above. Roller 222, however, comprises a dual motorized drive roller. That is, roller 222 is constructed to include a pair of internal motors such that separate power leads 272a, 272b for each of the two electric motor constructions 273a, 273b (FIG. 9) extend from the respective axles 262, 264 that are integrated with roller 222. Accordingly, axles 262, 264 are configured to extend through mounting plates 252a, 252b and into roller shaft mounts 254a, 254b for mounting to side frame members 244, 246. In the illustrated embodiment, rollers 20 and 220 are motorized drive rollers provided by Dematic Corp. of Grand Rapids, Mich.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A motor driven roller support assembly comprising:
a motorized roller, said motorized roller having a cylindrical outer surface with said motorized roller configured to provide driving rotation whereby said outer surface rotates;
a support frame, said motorized roller being mounted to said support frame;
a roller support, said roller support engaging said outer surface of said motorized roller;
wherein said roller support includes a pair of support wheels, and wherein said support wheels engage said outer surface of said motorized roller.

2. The assembly of claim 1, wherein said roller support is connected to said support frame.

3. The assembly of claim 2, wherein said roller support includes a pivot whereby said roller support is moveable relative to said motorized roller.

4. The assembly of claim 1, wherein said support wheels have axes of rotation that are substantially parallel with the axis of rotation of said motorized roller, ands wherein the axes of rotation of said support wheels are not collinear with respect to one another.

5. The assembly of claim 1, wherein said support wheels are mounted to a pivot plate, and wherein a pivot axle connects said pivot plate with said support frame.

6. The assembly of claim 5, wherein said pivot plate comprises a pair of pivot plates, and wherein said support wheels are mounted between said pivot plates.

7. The assembly claim 1, wherein said support frame includes a cross member and wherein said roller support is mounted to said cross member.

8. The assembly of claim 7, wherein said support frame includes a pair of side frame members and wherein said motorized roller is mounted to and between said side frame members, and wherein said side frame members are connected to said cross member.

9. The assembly of claim 8, further including a pair of roller shaft mounts, and wherein said roller shaft mounts connect to respective ends of said motorized roller to mount said motorized roller to said side frame members.

10. The assembly of claim 8, further including a pair of mounting plates, each said mounting plate being connected to a respective one of said side frame members, wherein said mounting plates connect to respective ends of said motorized roller to mount said motorized roller to said side frame members.

11. The assembly of claim 1, wherein said motorized roller includes either one or two internal motors within a cylindrical tube of said motorized roller.

12. A transfer conveyor, said transfer conveyor comprising:
   a frame to which rollers are mounted, with said rollers oriented to convey items in a first direction;
   a platform disposed beneath said rollers, said platform configured to being raised and lowered relative to said rollers;
   a transfer blade mounted to said platform, said transfer blade including a belt, and wherein said transfer blade is configured to be extended upwards between said rollers with said belt being driven and configured to convey items in a second direction; and
   a motor driven roller support assembly, said motor driven roller support assembly comprising a motorized roller, a support frame, and a roller support;
   wherein said motorized roller has a cylindrical outer surface with said motorized roller being mounted to said support frame and configured to provide driving rotation whereby said outer surface rotates, and wherein said belt engages said outer surface of said motorized roller whereby said motorized roller imparts driving motion to said belt, and wherein said roller support engages said outer surface of said motorized roller.

13. The transfer conveyor of claim 12, wherein said transfer blade has a longitudinal orientation extending with the direction of movement of said belt, and wherein the longitudinal orientation of said transfer blade is oriented perpendicularly to the axis of rotation of said motorized roller.

14. The transfer conveyor of claim 12, wherein said transfer conveyor comprises two said transfer blades, and wherein said belts of said transfer blades contact said outer surface of said motorized roller on opposite sides of said roller support relative to the longitudinal length of said motorized roller.

15. The transfer conveyor of claim 12, wherein said belt of said transfer blade engage said outer surface of said motorized roller in a generally diametrically opposite orientation relative to the engagement of said roller support with said motorized roller.

16. The transfer conveyor of claim 12, wherein between two to eight transfer blades are mounted to said platform.

17. The transfer conveyor of claim 12, wherein said transfer conveyor comprises a right angle transfer with said second direction being orthogonal to said first direction.

18. The transfer conveyor of claim 17, further comprising a plurality of rollers upon which objects are configured to be moved with said platform disposed beneath said rollers, and wherein a plurality of transfer blades are mounted to said platform with said platform configured to be raised to extend each said transfer blade between a pair of said rollers.

19. The transfer conveyor of claim 12, wherein said roller support is connected to said support frame with said roller support including a pivot whereby said roller support is moveable relative to said support frame, and wherein said roller support includes a pair of support wheels that engage said outer surface of said motorized roller, and wherein said support wheels have axes of rotation that are substantially parallel with the axis of rotation of said motorized roller.

20. A motor driven roller support assembly comprising:
   a motorized roller, said motorized roller having a cylindrical outer surface with said motorized roller including an internal motor configured to provide driving rotation whereby said outer surface rotates;
   a support frame, said motorized roller being mounted to said support frame; and
   a roller support, said roller support including a support wheel;
   wherein said support wheel engages said outer surface of said motorized roller.

21. The assembly of claim 20, wherein said roller support includes a pair of support wheels that both engage said outer surface of said motorized roller, and wherein said roller support includes a pivot whereby said support wheels are moveable relative to said motorized roller.

* * * * *

UNITED STATES PATENT AND TRADEMARK OFFICE
CERTIFICATE OF CORRECTION

PATENT NO. : 10,112,782 B2
APPLICATION NO. : 15/623908
DATED : October 30, 2018
INVENTOR(S) : Paul L. Wetters et al.

It is certified that error appears in the above-identified patent and that said Letters Patent is hereby corrected as shown below:

In the Claims

Claim 4
Line 62, "ands" should be --and--

Signed and Sealed this
Nineteenth Day of February, 2019

Andrei Iancu
*Director of the United States Patent and Trademark Office*